United States Patent [19]

Gaul et al.

[11] 4,438,518

[45] Mar. 20, 1984

[54] METHOD FOR PROTECTING FORMING BUSHINGS

[75] Inventors: David J. Gaul; Jay W. Hinze; Richard A. Perkins, all of Newark, Ohio

[73] Assignee: Owens-Corning Fiberglas Corporation, Toledo, Ohio

[21] Appl. No.: 405,850

[22] Filed: Aug. 6, 1982

[51] Int. Cl.³ .............................................. C03B 5/02
[52] U.S. Cl. ........................................ 373/39; 373/28
[58] Field of Search ................... 373/39, 40, 28, 41, 373/27, 36

[56] References Cited

U.S. PATENT DOCUMENTS

| | | | |
|---|---|---|---|
| 2,314,956 | 3/1943 | Slayter et al. | 373/40 |
| 2,855,450 | 10/1958 | Eden | 373/39 |
| 3,984,612 | 10/1976 | Susser et al. | 373/39 |

Primary Examiner—Roy N. Envall, Jr.
Attorney, Agent, or Firm—Ronald C. Hudgens; Patrick P. Pacella

[57] ABSTRACT

A process for forming molten material in a melting furnace is disclosed. Bushings made of refractory or noble metal in the furnace are protected from cracking by applying a positive or anodic D.C. bias.

8 Claims, 3 Drawing Figures

METHOD FOR PROTECTING FORMING BUSHINGS

TECHNICAL FIELD

This invention relates to a method for protecting forming bushings by applying a direct current bias.

BACKGROUND ART

The cracking of glass forming bushings is one of the limiting factors in determining the life of such bushings. Premature failure of these bushings necessitates their replacement. Cracks often are observed in platinum alloys where electrolytic corrosion results because of a DC current. The current flow may be due to the presence of two dissimilar metals, platinum and molybdenum, connected via the conducting molten glass electrolyte and common grounds. The molybdenum usually is the metal employed in the electrodes of the melting furnace. Also, if similar metals are maintained at different potentials in the glass, a dc current may result.

DISCLOSURE OF THE INVENTION

The corrosion of metals in molten glass is electrochemical in nature. Because of this fact, one can externally alter the corrosion rate and the type of reactions occurring on an immersed metal surface by altering the electrical potential of the metal. Bushing cracks are caused by the formation of eutectic compounds along the grain boundaries which embrittle the alloy. The presence of the reaction species is due to the cathodic reactions occurring at the platinum surface. To eliminate this problem, the potential at the platinum surface may be altered by applying a dc bias.

The bushing firing circuit must be biased with respect to an electrode which could survive in the molten material with a cathodic reaction surface. Studies have shown that molybdenum can be effectively protected in glass by the addition of a negative current. By biasing the electrode firing circuit with the bushing firing circuit, the bushings can be protected.

BEST MODE OF CARRYING OUT INVENTION

Figure 2:
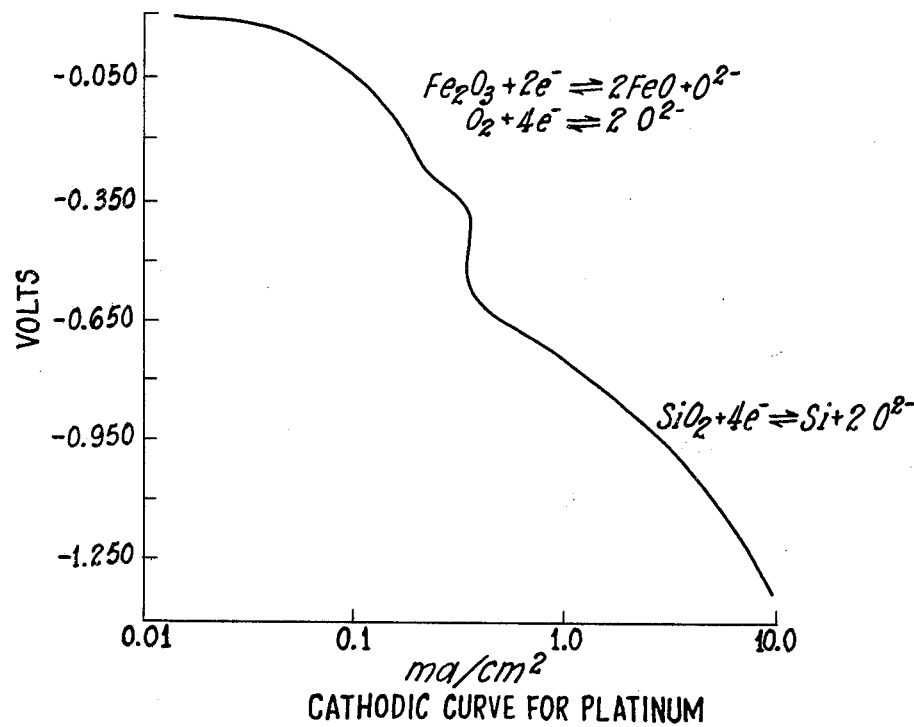
FIG. 2 is a graph of a cathodic curve for platinum where voltage is plotted against current density.
Figure 3:
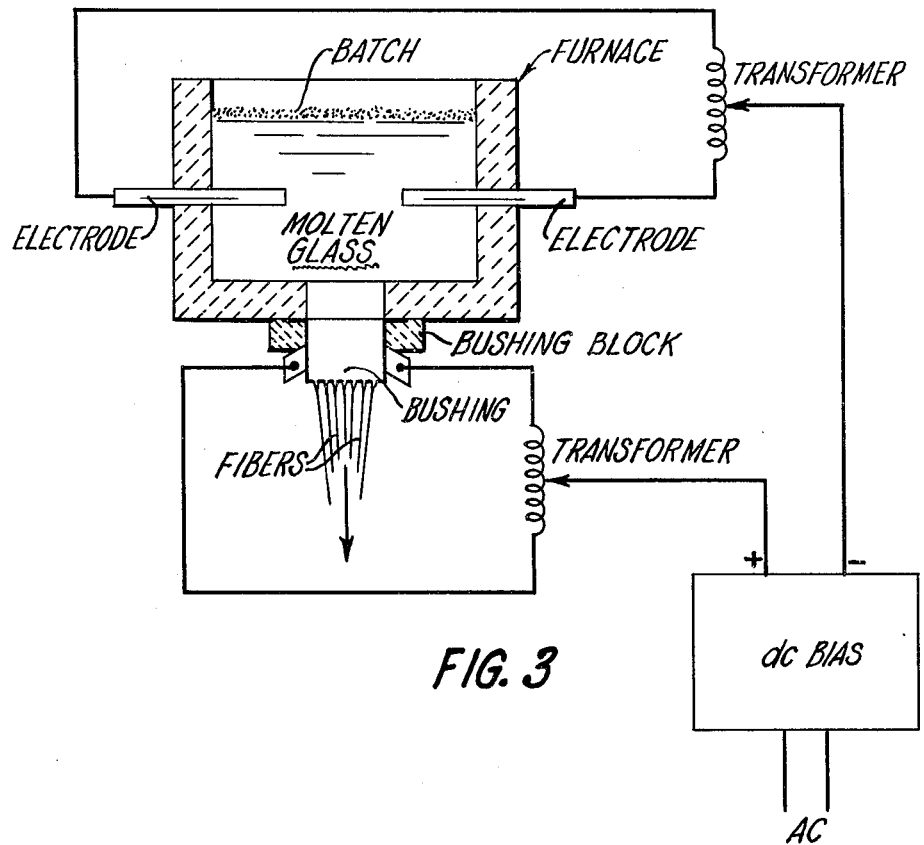
FIG. 3 shows an electric furnace with electrodes, a bushing and a schematic of the electric circuit employed in this invention.

A major cause of cracking in alloy bushings is due to silicon contamination of the platinum. The silicon results from the disassociation of silica in the glass. This results when the alloy is cathodically biased as shown in FIG. 2. The disassociation of soda, if present, will proceed and cause the silica reduction. This cathodic attack can be caused by an accidental bias applied to the bushing or by a much more active metal coming in contact with the alloy.

When platinum is anodically biased, oxidation reactions will occur at the metal/glass interface. The first reaction which occurs when the voltage is increased anodically would be the oxidation of ferrous iron to ferric iron. Next oxygen ions would be oxidized to form oxygen molecules and, subsequently, oxygen bubbles. Alloy loss occurs by formation of $PtO_2$, so, under anodic conditions, appreciable alloy loss may occur if oxygen bubbles are formed. However, no other degradation of the alloy occurs.

Figure 1:
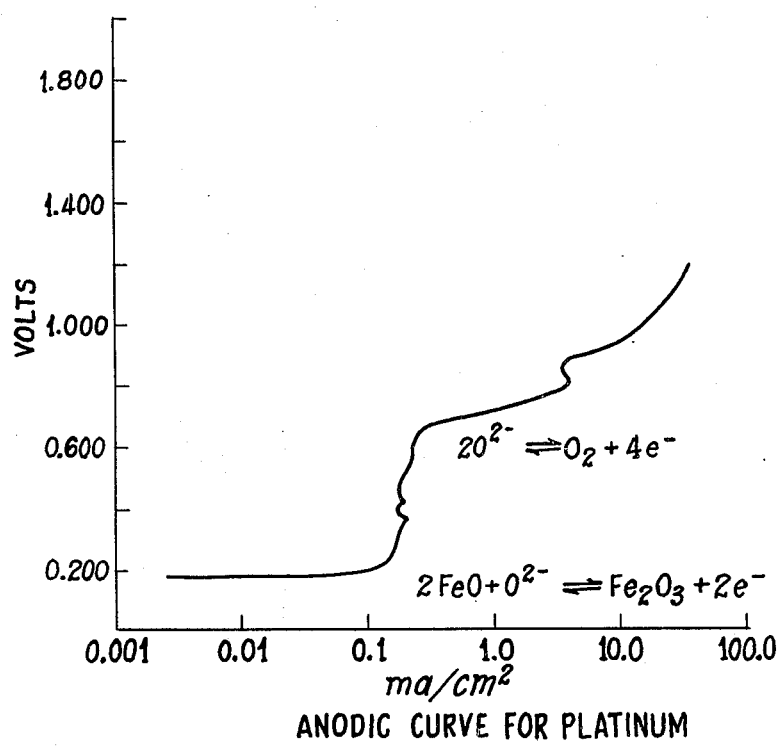
FIG. 1 is a graph of an anodic curve for platinum where voltage is plotted against current density.

FIGS. 1 and 2 show the onset of oxygen evolution at the anodic potentials and the reduction of silica at cathodic potentials. The bushing protection system was designed and operated to avoid these reactions. From the FIGURES, the optimum potential range in which platinum bushing should be maintained is from $-0.6$ v to $+0.2$ v versus a $Pt/O_2$ reference electrode.

In operation, an anodic current density of up to 0.1 $ma/cm^2$ is applied to the bushing using Mo electrodes as the cathode to offset any cathodic bias which the melter seems to be applying to the bushing. This current density avoids oxygen liberation as indicated by a low seed count in the glass.

The anodic protection of forming means, such as bushings or feeders, for making glass fibers is accomplished by applying an anodic D.C. bias to a bushing which has been electrically grounded. This grounding can even occur through the refractory. While the anodic protection is described in terms of a grounded bushing, any portion of the melter, such as a thermocouple or electrode made of precious metal, may be grounded in a similar manner. Also, there must be a cathodic material somewhere in the vicinity of the bushing to complete the D.C. circuit. The molybdenum electrodes of the melter often may serve the purpose of completing the D.C. circuit and acting as the cathode.

INDUSTRIAL APPLICABILITY

An electric furnace in accordance with this invention was hung in position beneath a batch feed system. Four electrodes were employed in the melter. They extended through sidewalls and were arranged as pairs of opposed, parallel electrodes. The electrodes were standard molybdenum electrodes. A production platinum bushing was installed below the melter with a refractory bushing block in place. The molten material was heated by joule effect by applying electrical current to the electrodes to flow between them through the molten material. The bushing was heated by resistive heating.

The bushing was a conventional textile bushing used to make continuous fibers. While E glass fibers and C glass fibers were produced, R glass or a basalt also could be made. Melter temperatures usually were above 2700° F. (1482° C.) and typically were about 2750° F. (1510° C.). Bushing temperatures usually were above 2100° F. (1149° C.) and typically were about 2200° F. (1204° C.).

Bushings operating under the above conditions were destroyed by cathodic attack in a short period of time. The anodic protection system described herein was installed in the furnace. Furnace electrodes were used as cathodes in the protection system. A field trial was conducted. No further problems with bushing cracking were found. Furthermore, seed counts remained acceptably low.

What is claimed is:

1. A process for forming molten glass in a melting furnace containing a body of electrically conductive molten glass having bushings made of a refractory or nobel metal and a bushing firing circuit, and having electrodes made of a dissimilar metal and an electrode firing circuit, applying electrical current to the bushing firing circuit to cause heating of the bushings by resistive heating, applying electrical current to the electrode firing circuit to cause electrical current to flow between the electrodes through the molten material to cause heating of the molten material by Joule effect and, simultaneously applying a positive or anodic direct current bias to the bushings, including the step of biasing the bushing firing circuit with the electrode firing circuit, to protect the bushings from cracking.

2. A process according to claim 1 including the step of using the electrodes as a cathode to offset any cathodic bias which the furnace may be applying to the bushings to protect the bushings from cracking.

3. A process according to claim 1 wherein the direct current bias has a current density ranging from greater than zero to 0.1 ma/cm$^2$.

4. A process according to claim 1 wherein the bushings have a voltage with a net potential ranging from $-0.6$ to $+0.2$ volts.

5. A process according to claim 1 wherein the bushings are commonly grounded with another means in the furnace made of a dissimilar metal.

6. A process according to claim 1 wherein the bushings are commonly grounded by maintaining them at different electrical potentials.

7. A process according to the claim 1 wherein the furnace is made of refractory brick and the grounding occurs through the refractory brick.

8. A process according to claim 1 wherein the bushings are made of platinum or platinum alloy and the electrodes are made of molybdenum or molybdenum alloy.

* * * * *